(12) United States Patent
Mochizuki

(10) Patent No.: US 8,291,702 B2
(45) Date of Patent: Oct. 23, 2012

(54) HYDROSTATIC TRANSMISSION

(75) Inventor: Yasuhisa Mochizuki, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 678 days.

(21) Appl. No.: 12/505,062

(22) Filed: Jul. 17, 2009

(65) Prior Publication Data

US 2010/0018201 A1    Jan. 28, 2010

(30) Foreign Application Priority Data

Jul. 22, 2008  (JP) ................. 2008-188925

(51) Int. Cl.
*F16D 31/02* (2006.01)
*F16H 39/10* (2006.01)
(52) U.S. Cl. .......................... 60/464; 60/487
(58) Field of Classification Search .......... 60/464, 60/427, 487, 489; 91/474, 485, 489
See application file for complete search history.

(56) References Cited

U.S. PATENT DOCUMENTS 4,891,943 A * 1/1990 Okada ....................... 60/464

FOREIGN PATENT DOCUMENTS

| JP | S60-182557 U | 4/1985 |
|----|----|----|
| JP | 2007-203972 A | 8/2007 |

OTHER PUBLICATIONS

Notice of Reasons for Refusal in JP 2008-188925, Japanese Patent Office, issued May 29, 2012, 3 pages (English Translation).

* cited by examiner

*Primary Examiner* — Thomas E Lazo
*Assistant Examiner* — Logan Kraft
(74) *Attorney, Agent, or Firm* — Sterne, Kessler, Goldstein & Fox, P.L.L.C.

(57) ABSTRACT

A hydrostatic transmission includes a closed fluid circuit, a hydraulic motor, a hydraulic pump fluidly connected to the hydraulic motor via the closed fluid circuit, and a fluid charging mechanism which supplies fluid delivered from the hydraulic pump to the closed fluid circuit during driving of the hydraulic pump.

8 Claims, 10 Drawing Sheets

US 8,291,702 B2

HYDROSTATIC TRANSMISSION

BACKGROUND OF THE INVENTION

1. Field of the Invention

The present invention relates to a hydrostatic transmission (hereinafter referred to as "HST") in which a hydraulic pump and a hydraulic motor are fluidly connected to each other via a closed fluid circuit, the HST including a fluid charging means for supplying fluid to the closed fluid circuit.

2. Related Art

A typical HST includes a hydraulic pump, a hydraulic motor, and a closed fluid circuit through which the hydraulic pump and motor are fluidly connected to each other. The closed fluid circuit includes a pair of main fluid passages interposed between the hydraulic pump and motor. The hydraulic pump is driven by an engine or the like so as to supply fluid to the hydraulic motor through the closed fluid circuit, thereby driving the hydraulic motor. The closed fluid circuit has to be supplied with additional fluid because it inevitably leaks fluid during operation. The lack of fluid in the closed fluid circuit can cause air bubbles in the fluid which causes inefficient reaction of the hydraulic motor.

Therefore, as disclosed in JP 2007-203972 A, the typical conventional HST is usually provided with an additional charge pump for supplying fluid to the closed fluid circuit. To drive the charge pump, a pump shaft of the hydraulic pump is used as a drive shaft of the charge pump, or an additional electric motor is provided. A fluid charging passage is provided for receiving fluid from the charge pump to be supplied to the closed fluid circuit. If the main fluid passages of the closed fluid circuit are formed in a center section on which the hydraulic pump and motor are mounted, the fluid charging passage is normally formed in the center section.

However, the addition of the charge pump increases the number of parts and costs. Further, if the charge pump is disposed apart from the closed fluid circuit, pipes have to be provided to fluidly connect the charge pump to the closed fluid circuit, and the pipes have to be prevented from interfering with other surrounding implements. If the charge pump is assembled in the HST, the HST is inhibited from being minimized.

SUMMARY OF THE INVENTION

An object of the invention is to provide an HST comprising a closed fluid circuit, a hydraulic motor, a hydraulic pump fluidly connected to the hydraulic motor via the closed fluid circuit, and a fluid charging means which can supply fluid to the closed fluid circuit instead of an additional charge pump or another additional member for supplying fluid to the closed fluid circuit.

To achieve the object, in the HST according to the invention, the fluid charging means supplies the closed fluid circuit with fluid to be delivered from the hydraulic pump to the closed fluid circuit during driving of the hydraulic pump.

Therefore, the HST is provided with no additional hydraulic pressure source, such as a charge pump, for supplying fluid to the closed fluid circuit, thereby reducing the number of parts and costs, and thereby being minimized or requiring no unwieldy piping connected to an external hydraulic pressure source.

As a first aspect of the invention, an HST comprises a pair of main fluid passages, a fluid charging passage for supplying fluid to one of the main fluid passages, a hydraulic motor, and a hydraulic pump fluidly connected to the hydraulic motor via the pair of main fluid passages. During driving of the hydraulic pump, one of the main fluid passages is hydraulically higher-pressurized, and the other of the main fluid passages is hydraulically lower-pressurized. The hydraulic pump includes a pump shaft, a cylinder block, a plurality of plungers, a movable swash plate, and a port member. The cylinder block is fixed on the pump shaft so as to be rotatable integrally with the pump shaft so that an axis of the pump shaft serves as a rotary axis of the cylinder block. The cylinder block includes first and second end surfaces opposite to each other in the axial direction of the pump shaft. The first end surface is nearer to the pair of main fluid passages than the second end surface. The cylinder block includes a plurality of cylinders disposed around the pump shaft. The cylinder block includes a plurality of cylinder ports extended from their respective cylinders and opened at the first end surface of the cylinder block. The plurality of plungers are fitted in the respective cylinders of the cylinder block so as to be reciprocally movable in the axial direction of the pump shaft, and project at tips thereof outward from the second end surface of the cylinder block. The movable swash plate has a slanted surface against which the tips of the plungers abut. The port member is interposed between the cylinder block and the pair of main fluid passages. The port member includes a surface against which the first end surface of the cylinder block slidably rotatably abuts. The port member includes a pair of kidney ports fluidly connected to the respective main fluid passages and opened at the surface of the port member. The port member includes a charge port fluidly connected to the fluid charging passage and opened at the surface of the port member. During rotation of the cylinder block of the hydraulic pump, the cylinder ports are opened one after another to the pair of kidney ports and the charge port, so that one of the kidney ports is defined as a delivery port via which fluid is delivered from the cylinders to the main fluid passage to be hydraulically higher-pressurized, another of the kidney ports is defined as a suction port via which fluid is sucked from the main fluid passage to be hydraulically lower-pressurized to the cylinders, and fluid is delivered from the cylinders to the fluid charging passage via the charge port.

Therefore, the only required processing of the existing port member having the kidney ports for ensuring fluid delivery from the hydraulic pump to the fluid charging passage is to form the charge port in the port member, thereby requiring no additional member for supplying fluid to the closed fluid circuit, and thereby reducing costs to supply fluid to the closed fluid circuit. When the charge port is formed in the port member, the position, size or shape of the charge port can be easily determined so as to realize the required direction, pressure, or amount of fluid delivered from the charge port.

Further, in the HST of the first aspect, as a second aspect, when viewed in the axial direction of the pump shaft, the cylinder ports are aligned on the first end surface of the cylinder block on a circle centered on the axis of the pump shaft, and the pair of kidney ports and the charge port are aligned on the surface of the port member on the circle.

In the HST according to the second aspect, one half of the circle is defined as a suction range on which the suction port is disposed, and the other half of the circle is defined as a delivery range on which the delivery port and the charge port is disposed.

Preferably, each of the halves of the circle is defined as either the suction range or the delivery range depending on a slant direction of the slanted surface of the movable swash plate. Said charge port is disposed on one half of the circle and another charge port is disposed on the other half of the circle, so that one of the charge ports disposed on the half of the circle defined as the delivery range is used for delivering fluid from the cylinders to the fluid charging passage.

Therefore, in whichever direction of the opposite directions the pump shaft and the cylinder block are rotated, one of the charge ports necessarily delivers fluid to the fluid charging passage so as to supply fluid to the closed fluid circuit.

In the HST according to the second aspect, preferably, the movable swash plate is rotatable and centered on a fulcrum axis which divides the circle into halves. The pair of kidney ports are line-symmetric with respect to the fulcrum axis. Said charge port is disposed in one half of the circle and another charge port is disposed in the other half of the circle so that the charge ports are line-symmetric with respect to the fulcrum axis.

Therefore, the pressure applied via one charge port onto the movable swash plate on one side of the fulcrum axis and the pressure applied via the other charge port onto the movable swash plate on the other side of the fulcrum axis is substantially equalized so as to prevent a moment from being applied onto the movable swash plate to deviate the movable swash plate from its proper tilt position.

Preferably, the HST of the first aspect includes a center section incorporating the pair of main fluid passages and the fluid charging passage. The port member is separate from the center section and is attached to the center section. Therefore, the port member can be a compact and handy member. Such a port member can be easily exchanged for a substitute port member in case the surface of the port member is worn away by its friction against the first end surface of the cylinder block, resulting in easier maintenance.

Alternatively preferably, the HST of the first aspect includes a center section incorporating the pair of main fluid passages and the fluid charging passage. The center section serves as the port member. Therefore, no additional port member is needed separately from the center section, thereby reducing the number of parts and costs.

Alternatively preferably, the HST of the first aspect includes a pump port block incorporating a pair of kidney ports and the fluid charging passage, which are adapted to be fluidly connected to the pair of main fluid passages separated from the pump port block. The port member is separate from the pump port block and is attached to the port pump block so that the kidney ports in the port member are fluidly connected to the respective kidney ports in the pump port block, and the charge port in the port member is fluidly connected to the fluid charging passage in the pump port block. Therefore, the pump port block separated from the main fluid passages can be compact, and the freedom in arrangement of the hydraulic pump and the hydraulic motor can be increased. The port member can be a compact and handy member. Such a port member can be easily exchanged for a substitute port member in case the surface of the pump port block is worn away by its friction against the first end surface of the cylinder block, resulting in easier maintenance.

Alternatively preferably, the HST of the first aspect includes a pump port block incorporating a pair of kidney ports and the fluid charging passage, which are adapted to be fluidly connected to the pair of main fluid passages separated from the pump port block. The pump port block further incorporates the charge port fluidly connected to the fluid charging passage so as to serve as the port member. Therefore, the pump port block separated from the main fluid passages can be compact, and the freedom in arrangement of the hydraulic pump and the hydraulic motor can be increased. No additional port member is needed separately from the pump port block, thereby reducing the number of parts and costs.

These and other objects, features and advantages will appear more fully in the following detailed description with reference to attached drawings.

DETAILED DESCRIPTION OF THE INVENTION

Figure 1:
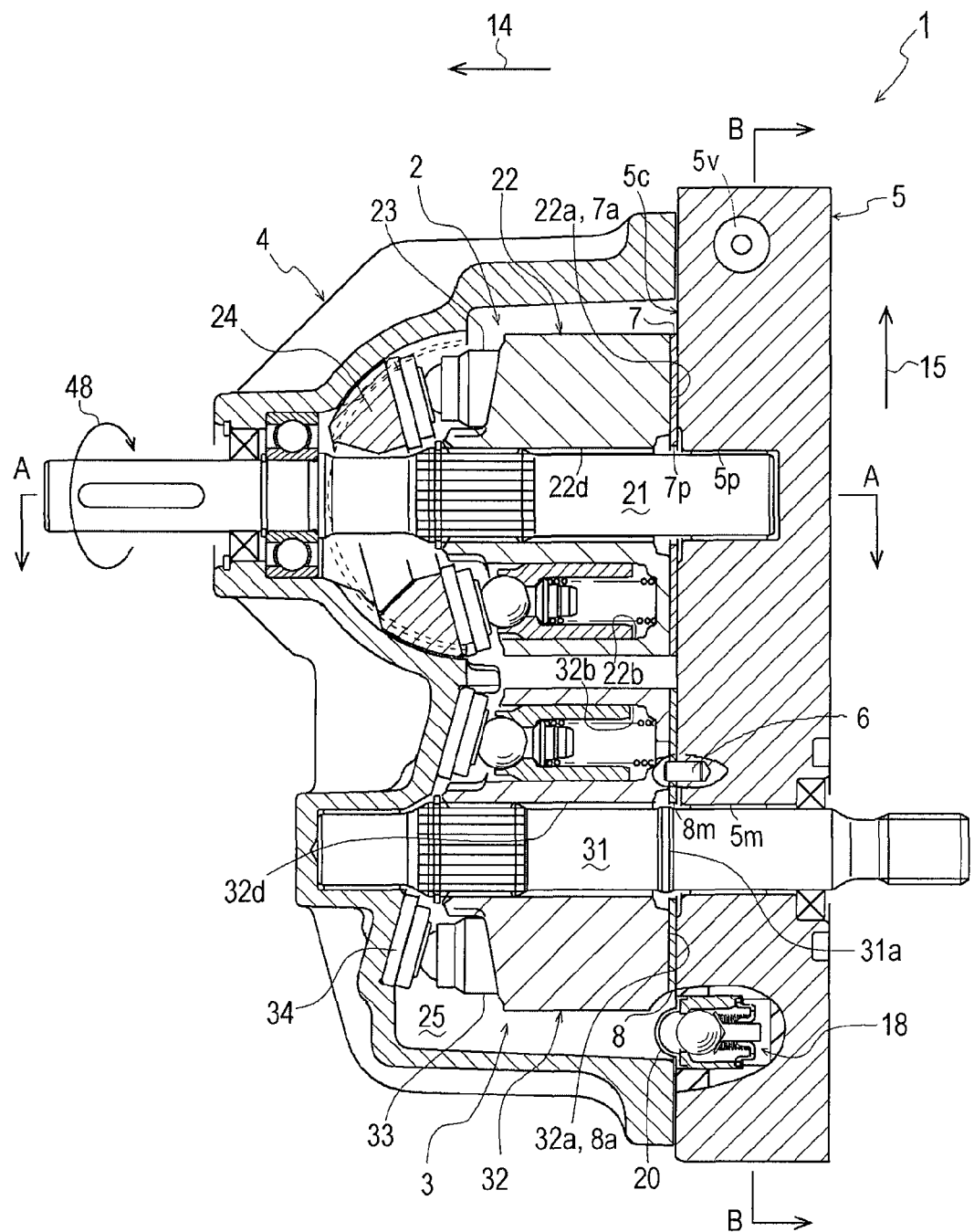
FIG. 1 is a sectional side view of a hydrostatic transmission (HST) according to the invention.

A hydrostatic transmission (HST) 1 will be described with reference to FIGS. 1 to 5 on the assumption that arrow 14 in FIG. 1 is directed forward and arrow 15 in FIG. 1 is directed upward.

HST 1 includes an axial plunger hydraulic pump 2, an axial plunger hydraulic motor 3, and a housing 4 incorporating hydraulic pump 2 and motor 3. In housing 4, hydraulic pump 2 and motor 3 are juxtaposed vertically so that hydraulic pump 2 is disposed above hydraulic motor 3. Housing 4 has a rear end surface surrounding a rear opening in which hydraulic pump 2 and motor 3 are disposed.

Figure 3:
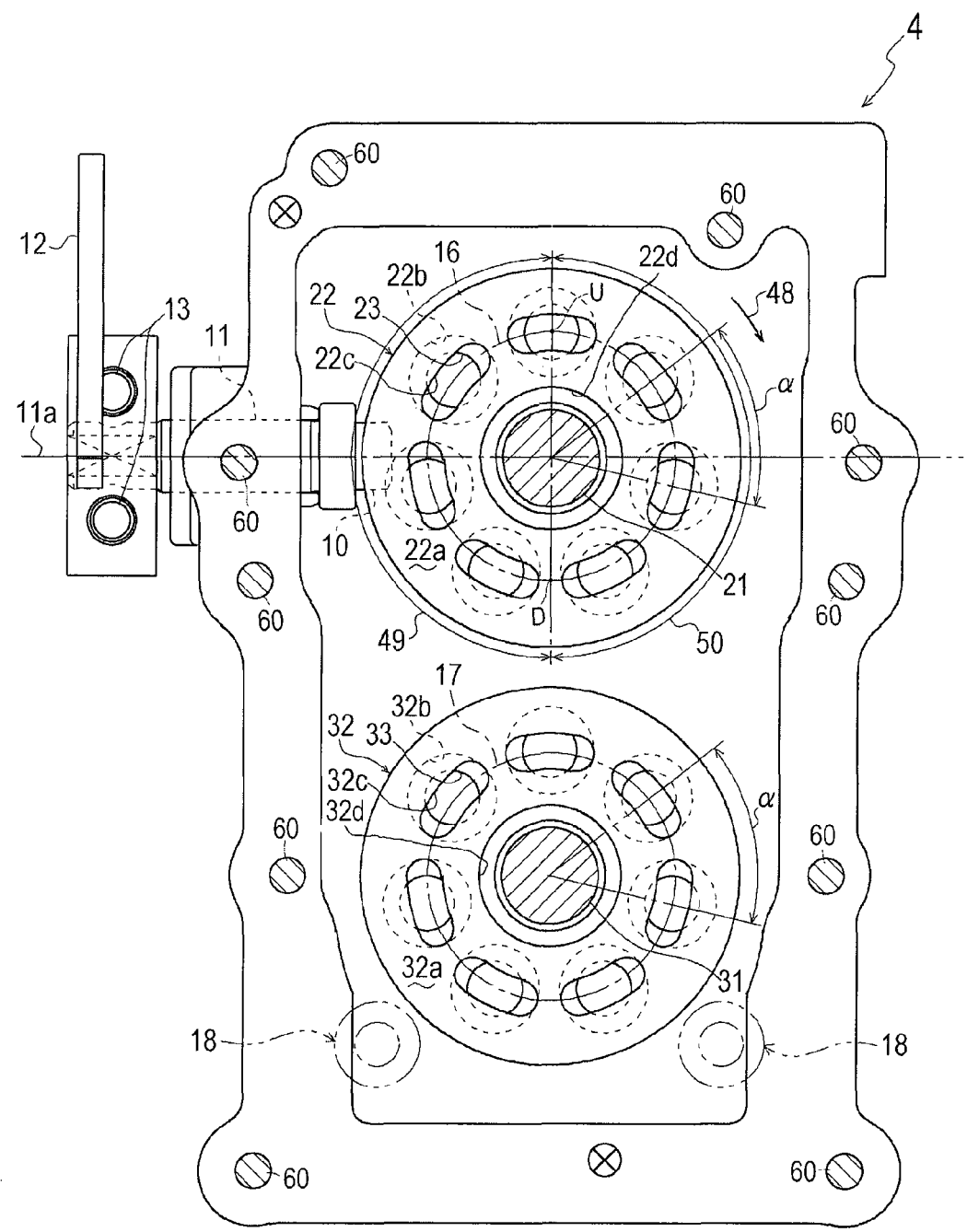
FIG. 3 is a rear view of the HST from which a center section has been removed, showing a housing which incorporates a hydraulic pump and a hydraulic motor.

Hydraulic pump 2 is a variable displacement hydraulic pump, which includes a vertical pump valve plate 7, a fore-and-aft horizontal pump shaft 21, a pump cylinder block 22, pump plungers 23, and a movable pump swash plate 24. Pump cylinder block 22 is penetrated at an axial center portion thereof by a pump shaft hole 22d. Pump shaft 21 is passed through pump shaft hole 22d and is fixed to pump cylinder block 22 so that the axis of pump shaft 21 serves as a rotary center axis of pump cylinder block 22. Pump cylinder block 22 is formed therein with fore-and-aft horizontal axial cylinders 22b. Cylinders 22b are arranged radially around the axis of pump shaft 21 at regular intervals so as to surround pump shaft 21. In this regard, as shown in FIG. 3, each pair of neighboring cylinders 22b form an angle α therebetween at the center axis of pump shaft 21. Plungers 23 are fore-and-aft reciprocally fitted into respective cylinders 22b, and project at front ends (tips) thereof forward from a front end surface of cylinder block 22.

Pump swash plate 24 is disposed in front of pump cylinder block 22, is slidably rotatably fitted to housing 4, and abuts against the front ends of plungers 23. The tilt angle and direction of pump swash plate 24 is variable so as to change the stroke of plungers 23, thereby changing the direction and amount of fluid delivered from hydraulic pump 2.

Figure 2:
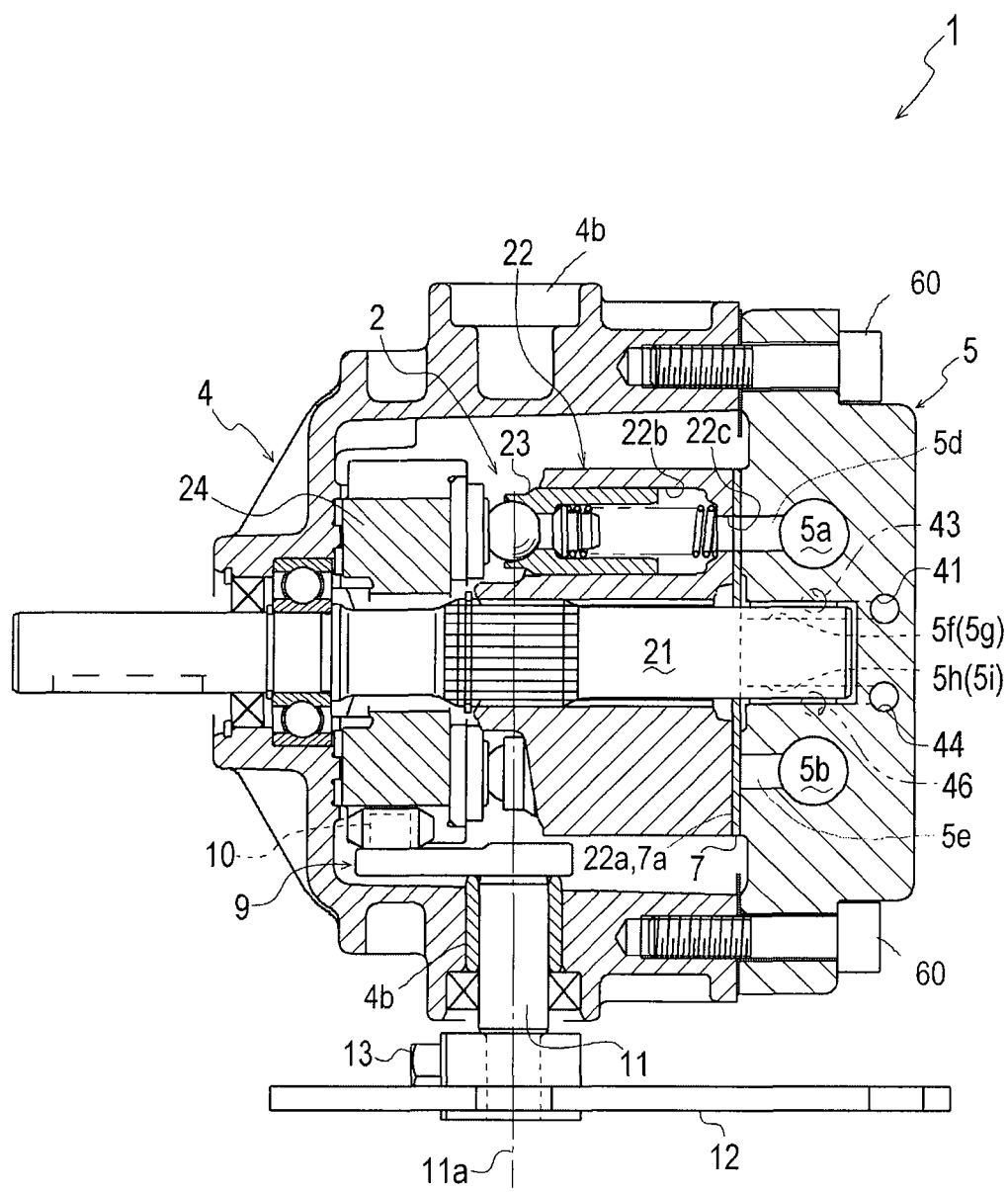
FIG. 2 is a cross-sectional view taken along A-A line of FIG. 1.

With respect to the tilt control of pump swash plate 24, as shown in FIG. 2, a horizontal pump control shaft 11 rotatably penetrates one of right and left walls of housing 4. In this regard, housing 4 is originally formed with right and left recesses 4b, which are opposite to each other with respect to hydraulic pump 2 and have respective thin wall portions facing the interior space of housing 4. Either right or left recess 4b is selected to have pump control shaft 11 therethrough. The thin wall portion of the selected one of recesses 4b is bored so as to form an inside-and-outside penetrating shaft hole 4a, and pump control shaft 11 is passed through shaft hole 4a.

Pump control shaft 11 is extended laterally and perpendicular to pump shaft 21. In housing 4, an inner arm 9 is fixed at one end thereof to an inner end of pump control shaft 11, and a pin 10 is extended from the other end of inner arm 9 and is fitted into a groove formed on a side portion of pump swash plate 24. Outside housing 4, an outer arm 12 is fixed at a basal end thereof to an outer end of pump control shaft 11 by a bolt 13. A top of outer arm 12 is adapted to be connected to an operation member such as a pedal or a lever. By rotating outer arm 12, inner arm 9 rotates so as to rotate pin 10 upward or downward centered on an axis 11a of pump control shaft 11, so that pump swash plate 24 rotates centered on axis 11a of pump control shaft 11. Axis 11a of pump control shaft 11 and its extension line are referred to as a fulcrum axis 11a for the tilt of pump swash plate 24.

Pump shaft 21 freely rotatably penetrates pump swash plate 24, is journalled by a front wall of housing 4 via a bearing, and projects forward from housing 4 so as to serve as an input shaft of HST 1 for receiving power from a prime mover.

Hydraulic motor 3 is a fixed displacement hydraulic motor, which includes a vertical motor valve plate 8, a fore-and-aft horizontal motor shaft 31, a motor cylinder block 32, motor plungers 33, and a fixed motor swash plate 34. The assembly of shaft 31, cylinder block 32 and plungers 33 in hydraulic motor 3 is similar to the above-mentioned assembly of those in hydraulic pump 2. In this regard, motor cylinder block 32 is penetrated at an axial center portion thereof by a motor shaft hole 32d. Motor shaft 31 is passed through motor shaft hole 32d and is fixed to motor cylinder block 32 so that the axis of motor shaft 31 serves as a rotary center axis of motor cylinder block 32. Further, motor cylinder block 32 is formed therein with fore-and-aft horizontal axial cylinders 32b. Cylinders 32b are arranged radially around the axis of motor shaft 31 at regular intervals so as to surround motor shaft 31. In this regard, as shown in FIG. 3, each pair of neighboring cylinders 32b form angle α therebetween at the center axis of motor shaft 31. Plungers 33 are fore-and-aft reciprocally fitted into respective cylinders 32b, and project at front ends (tips) thereof forward from a front end surface of cylinder block 32.

Motor swash plate 34 is fixed to an inner wall surface of housing 4 and abuts against the front ends of plungers 33. A front end of motor shaft 31 projects forward from motor swash plate 34 and is journalled by a front wall of housing 4.

A center section 5 is shaped as a vertical plate-shaped block having a vertical front surface 5c. A circumference area of front surface 5c abuts against the rear end surface of housing 4, and bolts 60 are screwed into housing 4 through center section 5 so as to fasten center section 5 to housing 4, so that center section 5 covers the rear end opening of housing 4. Center section 5 incorporates a later-discussed pair of main fluid passages 5a and 5b and later-discussed fluid charging passages 43 and 46 for supplying fluid to respective main fluid passages 5a and 5b.

In the rear end opening of housing 4, front surface 5c of center section serves as a pump mounting surface at an upper portion thereof, and serves as a motor mounting surface at a lower portion thereof. Pump valve plate 7 is fixed to the pump mounting surface via a pin 6, and motor valve plate 8 is fixed to the motor mounting surface via a pin 6, so as to have respective front surfaces 7a and 8a facing forward. Cylinder blocks 22 and 32 are attached onto center section 5 via respective valve plates 7 and 8 so that a rear end surface 22a of pump cylinder block 22 slidably rotatably abuts against front surface 7a of pump valve plate 7, and a rear end surface 32a of motor cylinder block 32 slidably rotatably abuts against front surface 8a of motor valve plate 8.

Center section 5 is formed with a pump shaft recess 5p opened forward at the pump mounting surface. Pump valve plate 7 has a center hole serving as a pump shaft hole 7p corresponding to pump shaft recess 5p. A rear end of pump shaft 21 projects rearward from rear end surface 22a of pump cylinder block 22, rotatably penetrates pump shaft hole 7p of pump valve plate 7, and is rotatably fitted into pump shaft recess 5p of center section 5.

Center section 5 is penetrated by a motor shaft hole 5m whose front end is opened forward at the motor mounting surface. Motor valve plate 8 has a center hole serving as a motor shaft hole 8m corresponding to motor shaft hole 5m. A rear end of motor shaft 31 projects rearward from rear end surface 32a of motor cylinder block 32, rotatably penetrates motor shaft hole 8m of motor valve plate 8 and motor shaft hole 5m of center section 5, and projects rearward from a rear surface of center section 5 so as to serve as an output shaft of HST 1.

Incidentally, as shown in FIG. 1, motor shaft 31 is peripherally formed on an axial intermediate portion thereof with a flange 31a having a diameter that is larger than a diameter of motor shaft hole 32d of motor cylinder block 32. After the assembling of hydraulic motor 3 with housing 4 and center section 5, flange 31a is disposed between a rear end of motor shaft hole 32d and a front end of motor shaft hole 8m of motor valve plate 8, so as to prevent motor shaft 31 from escaping from motor cylinder block 32.

In this way, hydraulic pump 2 and motor 3 are assembled in housing 4 and are attached to center section 5.

Center section 5 is formed therein with a closed fluid circuit including a pair of main fluid passages 5a and 5b. Hydraulic pump 2 and motor 3 are mounted to center section 5 in housing 4 so as to be fluidly connected to each other via main fluid passages 5a and 5b.

Figure 4:
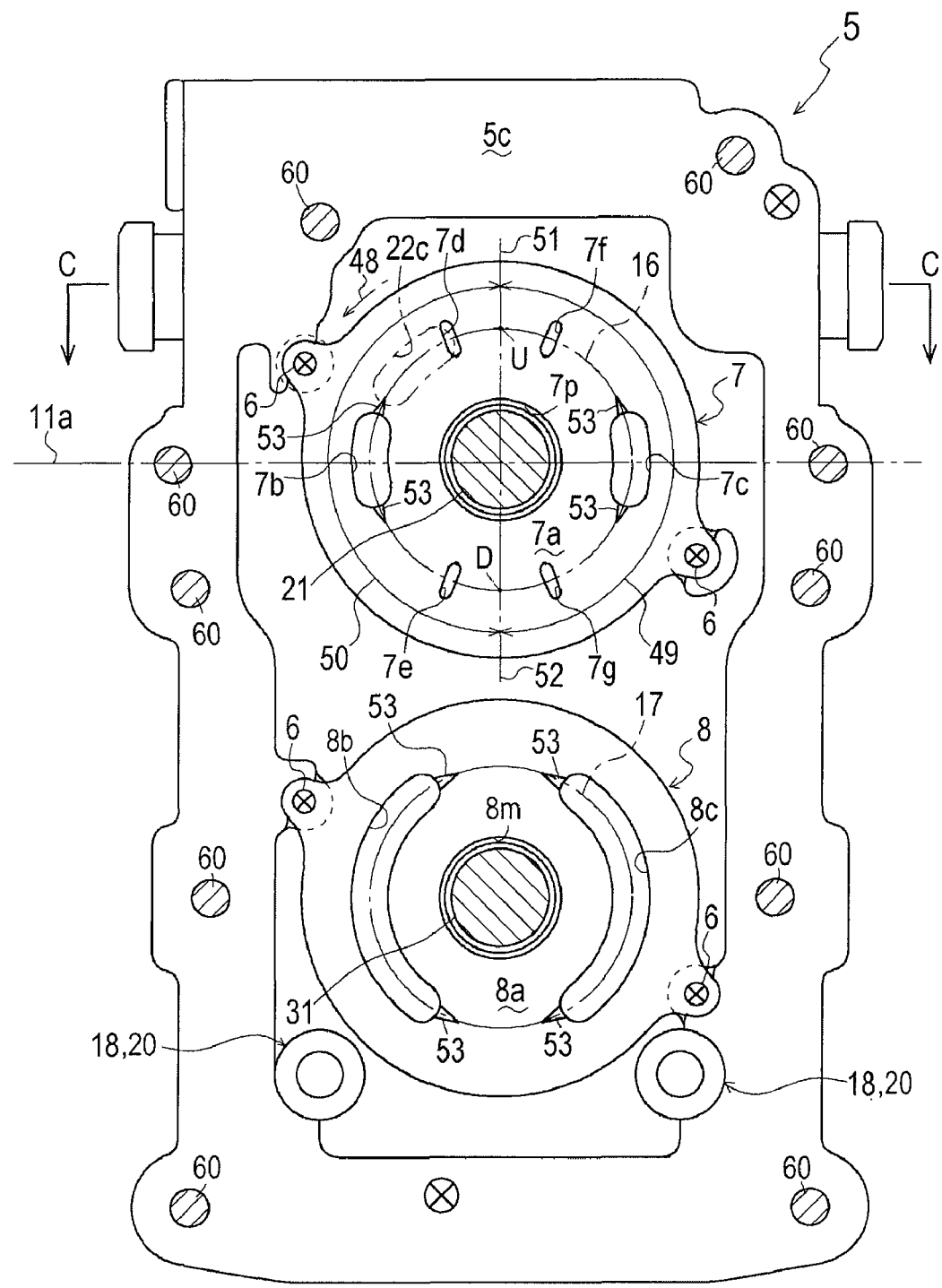
FIG. 4 is a front view of the HST from which the housing incorporating the hydraulic pump and motor has been removed, showing the center section on which a pump valve plate and a motor valve plate are fixed.
Figure 5:
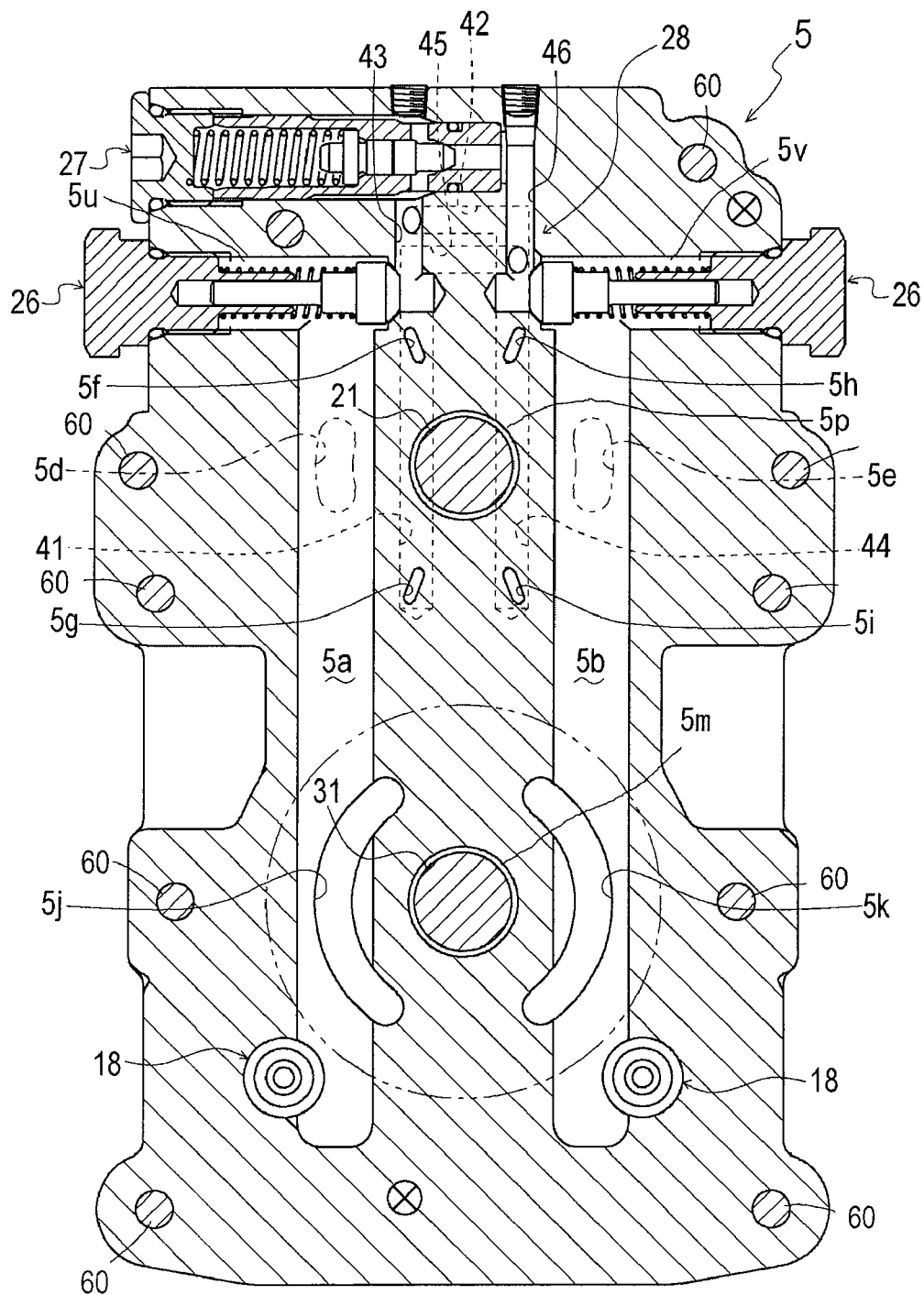
FIG. 5 is a cross-sectional view taken along B-B line of FIG. 2.

In this regard, as shown in FIG. 5, in center section 5, the pair of vertical right and left main fluid passages 5a and 5b are extended parallel to each other so as to have shaft holes 5p and 5m therebetween. In center section 5, a pair of pump kidney ports 5d and 5e are extended forward from respective main fluid passages 5a and 5b and are opened at front surface 5c, and as shown in FIG. 4, pump valve plate 7 is formed with a pair of pump kidney ports 7b and 7c such as to correspond to respective pump kidney ports 5d and 5e. Pump kidney ports 7b and 7c are opened at front surface 7a of pump valve plate 7 so as to be able to be fluidly connected to cylinders 22b of pump cylinder block 22 via cylinder ports 22c. When front surface 7a of valve plate 7 is viewed in front in the axial direction of pump shaft 21, kidney ports 7b and 7c in pump valve plate 7 and kidney ports 5d and 5e in center section 5 are aligned on a phantom circle 16 centered on the axis of pump shaft 21. Circle 16 on front surface 7a of pump valve plate 7 coincides to a corresponding phantom circle 16 drawn on rear end surface 22a of cylinder block 22 as shown in FIG. 3, as discussed later.

On the other hand, as shown in FIG. 5, in center section 5, a pair of motor kidney ports 5j and 5k are extended forward from respective main fluid passages 5a and 5b and are opened at front surface 5c, and as shown in FIG. 4, motor valve plate 8 is formed with a pair of motor kidney ports 8b and 8c such as to correspond to respective motor kidney ports 5j and 5k. Motor kidney ports 8b and 8c are opened at front surface 8a of motor valve plate 8 so as to be able to be fluidly connected to cylinders 32b of motor cylinder block 32 via cylinder ports 32c. When front surface 8a of motor valve plate 8 is viewed in front in the axial direction of motor shaft 31, kidney ports 8b and 8c in motor valve plate 8 and kidney ports 5j and 5k in center section 5 are aligned on a phantom circle 18 centered on the axis of motor shaft 31. Circle 17 on front surface 8a of motor valve plate 8 coincides to a corresponding phantom circle 17 drawn on rear end surface 32a of cylinder block 32 as shown in FIG. 3, as discussed later.

As shown in FIG. 3, pump cylinder block 22 is formed with cylinder ports 22c which are extended rearward from respective cylinders 22b and are opened at rear end surface 22a. When rear end surface 22a of cylinder block 22 is viewed in rear in the axial direction of pump shaft 21, each of cylinder ports 22c is arcuate, and all cylinder ports 22c are arranged at regular intervals to correspond to respective cylinders 22b, so that the arcuate shapes of cylinder ports 22c are extended and aligned on rear end surface 22a of cylinder block 22 on circle 16 which coincides to circle 16 on front surface 7a of valve plate 7, as shown in FIG. 4. In this way, when viewed in the axial direction of pump shaft 21, on circle 16 are aligned all cylinder ports 22c, cylinders 22b and plungers 23 in pump cylinder block 22, kidney ports 7b and 7c in pump valve plate 7, and kidney ports 5d and 5e in center section 5.

Similarly, motor cylinder block 32 is formed with cylinder ports 32c which are extended rearward from respective cylinders 32b and are opened at rear end surface 32a. When rear end surface 32a of cylinder block 32 is viewed from the rear in the axial direction of motor shaft 31, each cylinder port 32c is arcuate, and all cylinder ports 32c are arranged at regular intervals to correspond to respective cylinders 32b, so that the arcuate shapes of cylinder ports 32c are extended and aligned on rear end surface 32a of cylinder block 32 on circle 17 which coincides to circle 17 on front surface 8a of valve plate 8 as shown in FIG. 4. In this way, when viewed in the axial direction of motor shaft 31, on circle 17 are aligned all cylinder ports 32c, cylinders 32b and plungers 33 in motor cylinder block 32, kidney ports 8b and 8c in motor valve plate 8, and kidney ports 5j and 5k in center section 5.

Due to the above structure, main fluid passages 5a and 5b are fluidly connected to cylinders 22b in pump cylinder block 22 via kidney ports 5d and 5e in center section 5, kidney ports 7b and 7c in pump valve plate 7, and respective cylinder ports 22c, and are fluidly connected to cylinders 32b in motor cylinder block 32 via kidney ports 5j and 5k in center section 5, kidney ports 8b and 8c in motor valve plate 8, and respective cylinder ports 32c.

In this regard, during rotation of pump shaft 21 and pump cylinder block 22, cylinder ports 22c are opened one after another to each of kidney ports 7b and 7c. One of kidney ports 7b and 7c is selected as a delivery port of hydraulic pump 2 for delivering fluid from cylinders 22b to corresponding main fluid passage 5a or 5b, and the other as a suction port of hydraulic pump 2 for sucking fluid from corresponding main fluid passage 5a or 5b to cylinders 22b, depending on whether the slanted surface of pump swash plate 24 is directed upwardly forward or upwardly rearward.

When kidney port 7b is defined as the delivery port of hydraulic pump 2 and hydraulic pump 2 delivers fluid from kidney port 7b to main fluid passage 5a via kidney port 5d, the fluid flows from main fluid passage 5a into cylinders 32b of hydraulic motor 3 via kidney ports 5j and 8b and cylinder ports 32c, so as to thrust plungers 33 forward. The forwardly thrust plungers 33 are counter-pressed at front ends thereof rearward by fixed motor swash plate 34 so as to rotate motor cylinder block 32 and motor shaft 31 in one of opposite directions. As motor cylinder block 32 rotates, fluid in cylinders 33b pressurized by plungers 33 is released to main fluid passage 5b via kidney ports 5k and 8c, and fluid in main fluid passage 5b is sucked into cylinders 22b of pump cylinder block 22 via kidney port 5e and kidney port 7c serving as the suction port of hydraulic pump 2. In this way, main fluid passage 5a is hydraulically higher-pressurized, and main fluid passage 5b is hydraulically lower-pressurized.

On the contrary, when kidney port 7c is defined as the delivery port of hydraulic pump 2 and hydraulic pump 2 delivers fluid from kidney port 7c to main fluid passage 5b, the fluid in main fluid passage 5b flows into cylinders 32b via kidney ports 5k and 8c so as to rotate motor cylinder block 32 and motor shaft 31 in the other of the opposite directions. As motor cylinder block 32 rotates, fluid in cylinders 33b pressurized by plungers 33 is released to main fluid passage 5a via kidney ports 5j and 8b, and fluid in main fluid passage 5a is sucked into cylinders 22b of pump cylinder block 22 via kidney port 5d and kidney port 7b serving as the suction port of hydraulic pump 2. In this way, main fluid passage 5b is hydraulically higher-pressurized, and main fluid passage 5a is hydraulically lower-pressurized.

Figure 7:
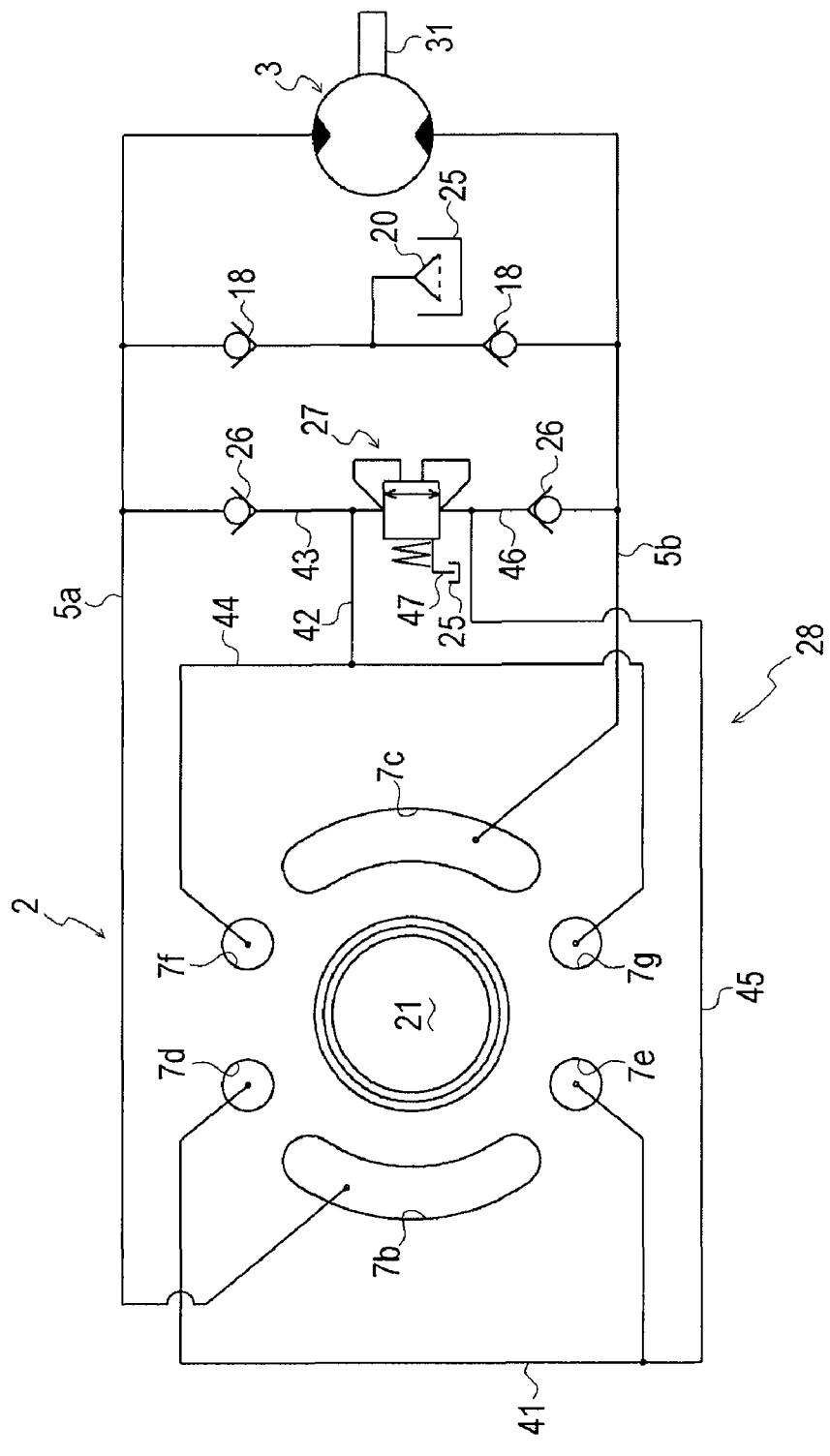
FIG. 7 is a hydraulic circuit diagram of the HST.

A fluid charging system for supplying fluid to the closed fluid circuit of HST 1 will be described. As shown in FIGS. 1, 5 and others, a pair of right and left charge check valves 18 are provided in center section 5 and are connected to lower end portions of respective main fluid passages 5a and 5b. As shown in FIG. 1, each of charge check valves 18 is a ball check valve facing a fluid sump 25 in housing 4 so as to be opened by hydraulic depression of corresponding main fluid passage 5a or 5b, so as to allow fluid to flow from fluid sump 25 to the hydraulically depressed main fluid passage 5a or 5b. Each charge check valve 18 is covered with a fluid filter 20 in fluid sump 25 so as to suck fluid filtered by fluid filter 20. Incidentally, fluid filters 20 on respective charge check valves 18 are illustrated in FIG. 7 as a single representative fluid filter for both charge check valves 18. Alternatively, a single common fluid filter 20 may actually be provided between fluid sump 25 and the pair of charge check valves 18 as shown in FIG. 7. Alternatively, an external reservoir tank may be provided outside housing 4 and an alternative pair of charge check valves may be disposed in center section 5 or in another part so as to charge fluid from the external reservoir tank to either main fluid passage 5a or 5b.

Charge check valves 18 are self-suction type charge check valves, which are adapted to suck fluid from fluid sump 25 in housing 4 without the driving power of pump shaft 21, thereby preventing a "free wheel" phenomenon of a vehicle equipped with HST 1 for driving its drive wheels and with an engine for driving HST 1. The free wheel phenomenon means the free rotation of drive wheels of the vehicle parked on a slope such as to cause the vehicle to unexpectedly descend the slope. In this regard, when the vehicle is parked on a slope when HST 1 is in neutral (pump swash plate 24 is disposed at its neutral position) and the engine is stopped, gravity is applied on the drive wheels so as to cause potential rotation of the drive wheels and motor shaft 31 drivingly connected to the drive wheels. The potential rotation force of motor shaft 31 causes the liability of hydraulic motor 3 acting as a pump. In this state, fluid filled in main fluid passages 5a and 5b of the closed fluid circuit acts as a dynamic brake against the potential pump action of hydraulic motor 3. As a result, fluid in one of main fluid passages 5a and 5b is excessively pressurized and becomes liable to leak out from a gap between cylinder block 22 or 32 and valve plate 7 or 8, from a gap between plunger 23 or 33 and cylinder block 22 or 32, or from another gap.

Once leak of fluid occurs, fluid begins circulating from lower-pressurized main fluid passage 5a or 5b to higher-pressurized main fluid passage 5b or 5a, and further causes leak of fluid. Finally, when the amount of fluid in main fluid passages 5a and 5b becomes insufficient to retain motor shaft 31 and the drive wheels, the drive wheels rotate so that the vehicle unexpectedly descends the slope. If the fluid supply to the closed fluid circuit relies upon a charge pump driven by the engine, the vehicle cannot prevent the free wheel phenomenon because the charge pump is stationary while the engine is stationary. On the contrary, self-suction type charge check valves 18 can supply fluid from fluid sump 25 to the closed fluid circuit of HST 1, regardless of whether the engine is driven or stopped, so as to prevent the free wheel phenomenon.

Besides charge check valves 18 serving as a free-wheel prevention means, HST 1 has a fluid charging mechanism 28 for supplying fluid to the closed fluid circuit during driving of HST 1. Fluid charging mechanism 28 is configured to utilize the pumping action of hydraulic pump 2 for smoothly supplying fluid to the closed fluid circuit instead of a charge pump, such as a trochoidal gear pump, driven by pump shaft 21.

Figure 6:
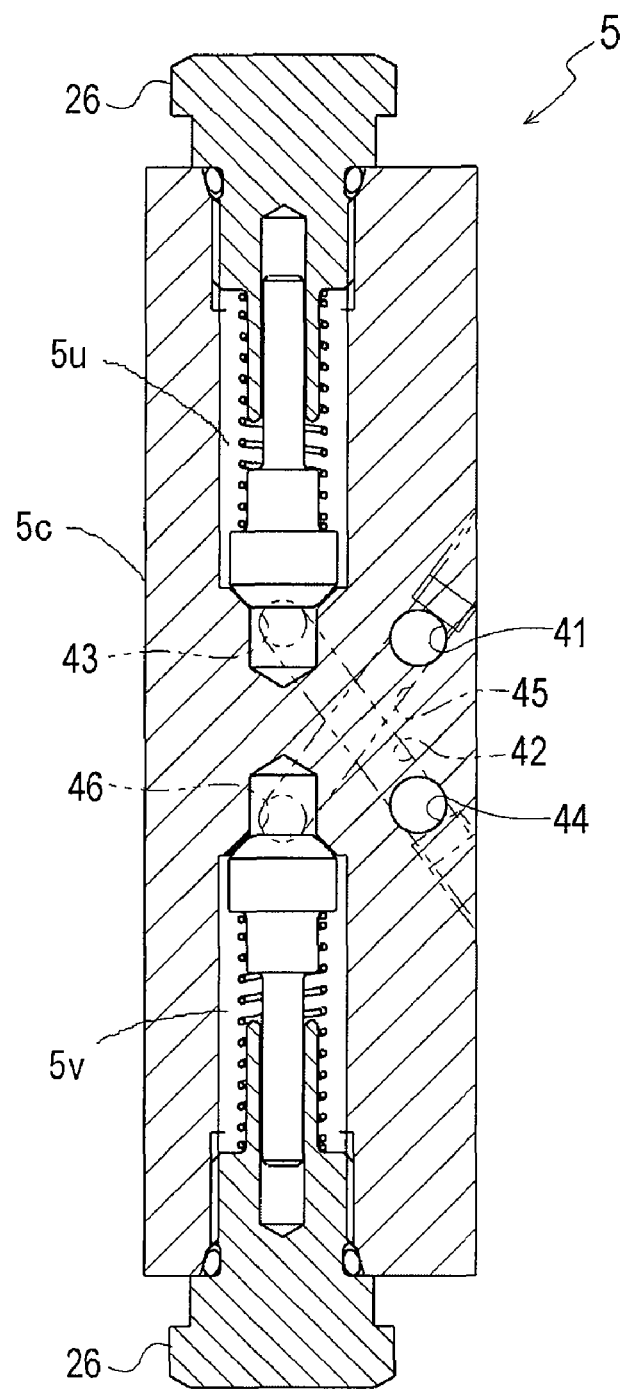
FIG. 6 is a cross-sectional view taken along C-C line of FIG. 4.

In this regard, a pair of charge check valves 26 and a bi-directive relief valve 27 are assembled in center section 5 as shown in FIGS. 5 and 6, and are connected to the closed fluid circuit of HST 1 as shown in FIG. 7. A pair of horizontal valve holes 5u and 5v are formed in center section 5 so as to extend laterally outward from top ends of respective main fluid passages 5a and 5b, and to have distal ends opened outward on respective right and left side surfaces of center section 5. Charge check valves 26 are fitted into respective valve holes 5u and 5v so as to plug the distal openings of valve holes 5u and 5v. A pair of vertical fluid charging passages 43 and 46 are formed in center section 5 so as to extend downward from a top surface of center section 5 in parallel to each other, and are connected at lower ends thereof to proximal ends of respective valve holes 5u and 5v. The top openings of fluid charging passages 43 and 46 are plugged.

A horizontal valve hole 5w is formed in center section 5 so as to extend laterally from fluid charging passage 46 through fluid charging passage 43, and have a distal end opened outward on one of right and left side surfaces of center section 5. Bi-directive relief valve 27 is fitted into valve hole 5w so as to plug the distal opening of valve hole 5w.

In this way, one of charge check valves 26 is interposed between fluid charging passage 43 and main fluid passage 5a, the other charge check valve 26 between fluid charging passage 46 and main fluid passage 5b, so that, when one of main fluid passages 5a and 5b is hydraulically depressed (lower-pressurized), corresponding charge check valve 26 is opened to supply hydraulically depressed main fluid passage 5a or 5b with fluid from corresponding fluid charging passage 43 or 46.

Bi-directive relief valve 27 is interposed between fluid charging passage 43 and fluid charging passage 46 so as to keep hydraulic pressure in each of fluid charging passages 43 and 46 at a predetermined value suitable as a charge pressure. When one of fluid charging passages 43 and 46 is hydraulically pressurized excessively, bi-directive relief valve 27 is opened to flow the excessive fluid to the other fluid charging passage 46 or 43 or to fluid sump 25 (see FIG. 7).

Fluid charging mechanism 28 uses the fluid delivery of hydraulic pump 2 for the fluid supply to fluid charging passages 43 and 46. In this regard, charge ports 5f, 5g, 5h and 5i are formed in center section 5 between main fluid passages 5a and 5b. Pump valve plate 7 is formed with charge ports 7d, 7e, 7f and 7g as shown in FIG. 4 so as to correspond to respective charge ports 5f, 5g, 5h and 5i. Charge ports 7d, 7e, 7f and 7g in pump valve plate 7 and charge ports 5f, 5g, 5h and 5i in center section 5 are aligned on circle 16 when viewed in the axial direction of pump shaft 21, thereby being able to be opened to cylinder ports 22c. Upper charge ports 5f and 5h in center section 5 and upper charge ports 7d and 7f in pump valve plate 7 are disposed at the same height above pump shaft 21 and kidney ports 5d, 5e, 7b and 7c. Lower charge ports 5g and 5i in center section 5 and lower charge ports 7e and 7g in pump valve plate 7 are disposed at the same height below pump shaft 21 and kidney ports 5d, 5e, 7b and 7c. Mutually corresponding upper charge ports 5f and 7d and mutually corresponding lower charge ports 5g and 7e are aligned on a vertical line. Mutually corresponding upper charge ports 5h and 7f and mutually corresponding lower charge ports 5i and 7g are aligned on a vertical line.

Center section 5 is formed therein with fluid charging passages 41, 42, 44 and 45 so as to fluidly connect fluid charging passages 43 and 46 to cylinders 22b in cylinder block 22. Horizontal fluid charging passage 42 is connected at one end thereof to a vertical intermediate portion of fluid charging passage 43, and a horizontal fluid charging passage 45 is connected at one end thereof to a vertical intermediate portion of fluid charging passage 46 below horizontal fluid charging passage 42. Horizontal fluid charging passages 42 and 45 are vertically offset from each other, however, horizontal fluid charging passages 42 and 45 are extended laterally slantwise so that, when viewed in plan as shown in FIG. 6, they appear crossing each other. Vertical fluid charging passage 41 is extended from the other end of horizontal fluid charging passage 45, and is opened to upper charge port 5f and lower charge port 5g. Vertical fluid charging passages 44 is extended from the other end of horizontal fluid charging passage 42, and is opened to upper charge port 5h and lower charge port 5i.

As shown in FIG. 1, it is now assumed that pump swash plate 24 is tilted to slant its surface abutting against plungers 23 upwardly forward and pump shaft 21 is rotated in an arrowed direction 48, i.e., when viewed in rear, pump shaft 21 is rotated clockwise. As shown in FIG. 4, when viewed in the axial direction of pump shaft 21, phantom circle 16 crosses a phantom upper vertical line 51 extended upward from the axis of pump shaft 21 at a top point U thereon, and crosses a phantom lower vertical line 52 extended downward from the axis of pump shaft 21 at a bottom point D thereon. During the rotation of pump cylinder block 22 and pump shaft 21 in direction 48, each of plungers 23 reciprocally sliding in respective cylinders 22b reaches its foremost sliding position when it reaches top point U on circle 16, and each of plungers 23 reaches its rearmost sliding position when it reaches bottom point D on circle 16.

On the assumption that pump shaft 21 and pump cylinder block 22 rotate in direction 48, one half 49 of circle 16 (semicircle 49) between top and bottom points U and D is defined as a suction range. As each plunger 23 moves on semicircle 49 serving as the suction range upward from bottom point D to top point U, the tip of plunger 23 abutting against pump swash plate 24 moves forward so that plunger 23 is thrust forward from cylinder block 22, thereby reducing the hydraulic pressure of fluid in corresponding cylinder 22b, whereby fluid is sucked into corresponding cylinder 22b from main fluid passage 5b via kidney ports 5e and 7c when corresponding cylinder port 22c comes to be opened to kidney port 7c. When each cylinder port 22c moving on semicircle 49 serving as the suction range is opened to charge port 7g or 7f, no fluid is sucked into corresponding cylinder 22b via charge port 7g or 7f from fluid charging passage 43 because charge check valve 26 between main fluid passage 5a and fluid charging passage 43 is closed and by-directive relief valve 27 is close to isolate fluid charging passage 43 from fluid charging passage 46 (unless the hydraulic pressure of fluid in fluid charging passage 46 becomes excessive so as to open bi-directive relief valve 27) while charge check valve 26 corresponding to hydraulically depressed main fluid passage 5b is opened.

On the same assumption, the other half 50 of circle 16 (semicircle 50) between top and bottom points U and D is defined as a delivery range. As each plunger 23 moves on semicircle 50 serving as the delivery range downward from top point U to bottom point D, the tip of plunger 23 abutting against pump swash plate 24 moves rearward so that plunger 23 is withdrawn rearward into cylinder block 22, thereby increasing the hydraulic pressure of fluid in corresponding cylinder 22b, whereby fluid is delivered from corresponding cylinder 22b to main fluid passage 5a via kidney ports 7b and 5d when cylinder port 22c comes to be opened to kidney port 7b. In the movement of each plunger 23 on semicircle 50 serving as the delivery range, when corresponding cylinder port 22c comes to be opened to charge port 7d or 7e, fluid is delivered from corresponding cylinder 22b to fluid charging passage 46 via either upper charge ports 7d and 5f or lower charge ports 7e and 5g and via passages 41 and 45.

On the contrary, when pump shaft 21 and pump cylinder block 22 rotate in direction 48 and pump swash plate 24 is tilted to slant its surface abutting against plungers 23 upwardly rearward, hydraulic pump 2 delivers fluid to hydraulic motor 3 so as to rotate motor cylinder block 32 and motor shaft 31 in the direction opposite to that when pump swash plate 24 is tilted to the slant surface upwardly forward. In this state, semicircle 49 is defined as the delivery range for the fluid delivery process of each plunger 23, and semicircle 50 is defined as the suction range for the fluid suction process of each plunger 23.

In the fluid suction process of each plunger 23, when corresponding cylinder port 22c comes to be opened to kidney port 7b, fluid is sucked from main fluid passage 5a to corresponding cylinder 22b via kidney ports 5d and 7b. Even when corresponding port 22c comes to be either charge port 7d or 7e, fluid is not sucked from fluid charging passage 46 to corresponding cylinder 22b via charge port 7d or 7e because charge check valve 26 between main fluid passage 5b and fluid charging passage 46 is closed and by-directive relief valve 27 isolates fluid charging passage 46 from fluid charging passage 43 (unless the hydraulic pressure of fluid in fluid charging passage 43 becomes excessive so as to open bi-directive relief valve 27) while charge check valve 26 corresponding to hydraulically depressed main fluid passage 5a is opened.

In the fluid delivery process of each plunger 23, when corresponding cylinder port 22c comes to be opened to kidney port 7c, fluid is delivered from corresponding cylinder 22b to main fluid passage 5b via kidney ports 7c and 5e. When corresponding cylinder port 22c comes to be either charge port 7f or 7g, fluid is delivered from corresponding cylinder 22b to fluid charging passage 43 via either upper charge ports 7f and 5h or lower charge ports 7g and 5i and via passages 44 and 42.

Due to fluid charging mechanism 28 having the above-mentioned structure, in which a part of fluid delivered from hydraulic pump 2 serves as pressurized fluid to be supplied to the closed fluid circuit of HST 1 during driving of pump shaft 21, HST 1 needs no additional charge pump for supplying fluid to the closed fluid circuit thereof, thereby reducing the number of parts and costs, and resulting in easier maintenance. In this regard, if a charge pump for supplying fluid to the closed fluid circuit of HST 1 were assembled in HST 1, e.g., in center section 5, entire HST 1 would be expanded. If such a charge pump were disposed outside HST 1, HST 1 would need pipes disposed outside HST 1 to be connected to the charge pump, thereby needing a large space surrounding HST 1 so as to prevent the pipes from interfering with another surrounding member. Thus, fluid charging mechanism 28 allows minimization of HST 1.

Pump valve plate 7 having kidney ports 7b and 7c and charge ports 7d, 7e, 7f and 7g will be described with reference to FIGS. 3 and 4. Each of kidney ports 7b and 7c substantially coincides in shape and size to each of cylinder ports 22c. Each of charge ports 7d, 7e, 7f and 7g has a width in the radial direction of hydraulic pump 2 (from the axis of pump shaft 21), which is as large as that of each cylinder port 22c, however, it is very short in the peripheral direction of hydraulic pump 2, so as to serve as a throttle for greatly reducing the amount of fluid delivered from hydraulic pump 2 to either fluid charging passage 43 or 46, thereby reducing power loss. In this regard, charge ports 5f, 5g, 5h and 5i in center section 5 substantially coincide in shape and size to respective charge ports 7d, 7e, 7f and 7g.

Charge ports 7d and 7f are disposed on respective semicircles 49 and 50 adjacent to top point U therebetween. Charge ports 7e and 7g are disposed in respective semicircles 49 and 50 adjacent to bottom point D therebetween. The reciprocal movement speed of plungers 23 is minimized in the vicinity of each of top and bottom points U and D so as to minimize the changing speed of amount and pressure of fluid in respective cylinders 22b. Therefore, fluid charged via each of charge ports 7d, 7e, 7f and 7g in the vicinity of top or bottom point U or D is stable in amount and pressure.

Pump swash plate 24 pressed against plungers 23 is liable to unexpectedly tilt centered on horizontal fulcrum axis 11a at the vertical middle thereof if the hydraulic pressure of cylinders 22b applied on the upper portion of pump swash plate 24 above fulcrum axis 11a and the hydraulic pressure of cylinders 22b applied on the lower portion of pump swash plate 24 below fulcrum axis 11a are unbalanced because of their change caused by connection of any cylinder port 22c to a port in valve plate 7. In consideration of this situation of pump swash plate 24, kidney ports 7b and 7c and charge ports 7d, 7e, 7f and 7g are formed and arranged line-symmetrically with respect to horizontal fulcrum axis 11a, so as to keep the balance between the hydraulic pressure applied onto the upper portion of swash plate 24 above fulcrum axis 11a and the hydraulic pressure applied onto the lower portion of swash plate 24, thereby preventing pump swash plate 24 during the driving of hydraulic pump 2 from receiving a moment such as to unexpectedly tilt pump swash plate 24.

Pump valve plate 7 is formed with notches 53 at opposite ends of each of kidney ports 7b and 7c on circle 16. When viewed in the axial direction of pump shaft 21, each notch 53 is taper-shaped and extended in the direction of circle 16 so that it becomes narrower in the radial direction of pump shaft 21 as it goes away from corresponding kidney port 7b or 7c. Therefore, on the starting and ending of fluid connection of each cylinder port 22c to each of kidney ports 7b and 7c, sudden hydraulic pressure change, causing pulsating of fluid flow and noise, is avoided. Similarly, motor valve plate 8 is formed with notches 53 at opposite ends of each of kidney ports 8b and 8c on circle 17.

Each notch 53 is adapted to be opened at its small opening to each cylinder port 22c or 32c and to gradually increase its area opened to cylinder port 22c or 32c immediately before the proper opening of cylinder 22c or 32c to the corresponding kidney port, thereby avoiding sudden start of fluid delivery to the kidney port or of fluid suction from the kidney port, and thereby avoiding noisy pulsation of hydraulic pressure caused by the sudden start of fluid delivery or suction.

Incidentally, the rotation of motor cylinder block 32 and motor shaft 31 is reversible according to the tilt direction of pump swash plate 24. Therefore, motor valve plate 8 is formed with the pair of notches 53 at the respective opposite ends of each of kidney ports 7b and 7c in the direction of circle 17, so that any one of notches 53 can be opened to each cylinder port 32c immediately before cylinder port 32c is opened to corresponding kidney port 8b or 8c regardless of whether motor cylinder block 32 and motor shaft 31 rotate in one direction or in the other direction.

Further, in pump valve plate 7 shown in FIG. 4, the pair of notches 53 are formed at the opposite ends of each of kidney ports 7b and 7c in the direction of circle 16 so as to correspond to whether pump cylinder block 22 and pump shaft 21 are set to rotate in direction 48 or the opposite direction. However, if the rotation of pump shaft 21 in the direction opposite to direction 48 is impossible, only one notch 53 may be formed at one end of each kidney port 7b or 7c so as to be opened to each cylinder port 22c immediately before cylinder port 22c is opened to corresponding kidney port 7b or 7c.

Figure 8:
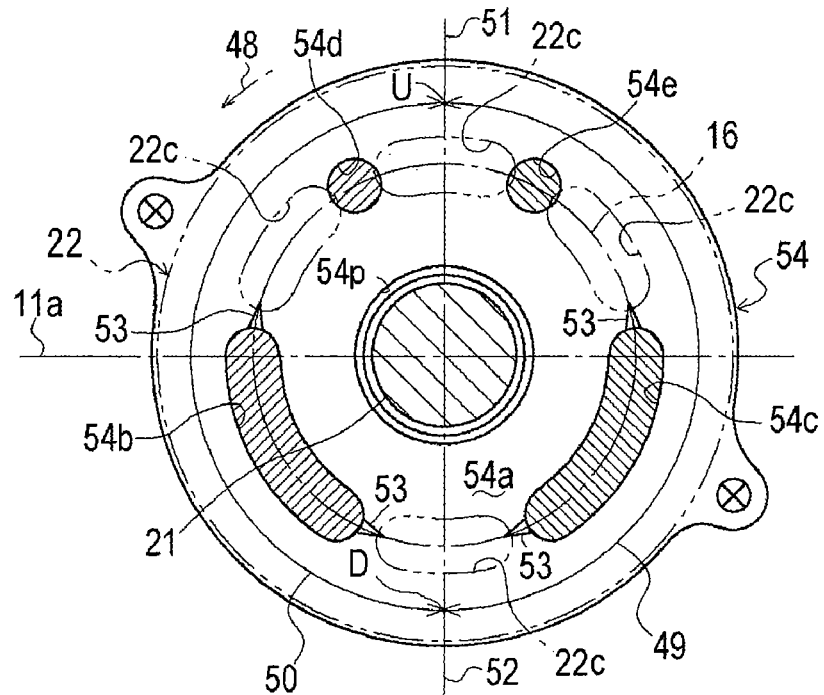
FIG. 8 is a front view of an alternative pump valve plate having line-symmetric ports.

An alternative pump valve plate 54 will be described with reference to FIG. 8. Similar to circle 16 on pump valve plate 7, phantom circle 16 is drawn on a front surface 54a of valve plate 54 so as to define the rotation locus of cylinder ports 22c and is divided into semicircles 49 and 50 by vertical lines 51 and 52 extended upward and downward from the axis of pump shaft 21 passed through a shaft hole 54p bored at a central portion of pump valve plate 7.

A pair of circular charge ports 54d and 54e are formed in an upper portion of pump valve plate 54 and are opened at front surface 54a. Charge port 54d is disposed on semicircle 50 above horizontal fulcrum axis 11a, and charge port 54e is disposed on semicircle 49 above horizontal fulcrum axis 11a so that right and left charge ports 54d and 54e are line-symmetric with respect to upper vertical line 51. One of charge port 54d and 54e is selected for delivering fluid to fluid charging passage 43 or 46 (in other words, one of semicircles 49 and 50 is defined as the delivery range) depending on whether pump swash plate 24 is set to rotate pump cylinder block 22 in arrowed direction 48 or in the opposite direction.

A pair of arcuate kidney ports 54b and 54c are formed in a lower portion of pump valve plate 54 and are opened at front surface 54a. Kidney port 54b is disposed on semicircle 50 below horizontal fulcrum axis 11a and kidney port 54c is disposed on semicircle 49 below horizontal fulcrum axis 11a so that right and left kidney ports 54b and 54c are line-symmetric with respect to lower vertical line 52. The arcuate shape of each kidney ports 54b and 54c is extended along circle 16 and each of kidney ports 54b and 54c is formed at opposite ends thereof in the direction of circle 16 with respective notches 53 for preventing the pulsation of hydraulic pressure. Center section 5 is formed therein with kidney ports corresponding to respective kidney ports 54b and 54c, which are connected to respective main fluid passages 5a and 5b.

Charge check valves 26, bi-directive relief valve 27, fluid charging passages 43 and 46 and horizontal fluid charging passages 42 and 45 are provided in the upper portion of center section 5 above pump valve plate 54, similar to those in center section 5 with pump valve plate 7. Vertical fluid charging passages 41 and 44 are extended downward from respective horizontal fluid charging passages 42 and 45 so as to be opened to respective charge ports 54d and 54e. Vertical fluid charging passages 41 and 44 for pump valve plate 54 can be shorter than those for pump valve plate 7 because pump valve plate 54 includes only charge ports 54d and 54e above horizontal fulcrum axis 11a and no charge port below fulcrum axis 11a.

Front surface 54a of pump valve plate 54 includes portions defined as respective gaps on circle 16 between charge ports 54d and 54e, between charge port 54d and upper notch 53 of kidney port 54b, between lower notch 53 of kidney port 54b and lower notch 53 of kidney port 54c, and between charge port 54e and upper notch 53 of kidney port 54c. Each of the gaps is slightly shorter than the arcuate length of each of cylinder ports 22c of pump cylinder block 22 on circle 16. Therefore, during rotation of pump cylinder block 22, at least a very small area of each of cylinder ports 22c is constantly opened to any one of charge ports 54d and 54e, kidney ports 54b and 54c and notches 53, thereby preventing noisy pulsation of hydraulic pressure and damaging excessive hydraulic pressurization in cylinders 22b.

Figure 9:
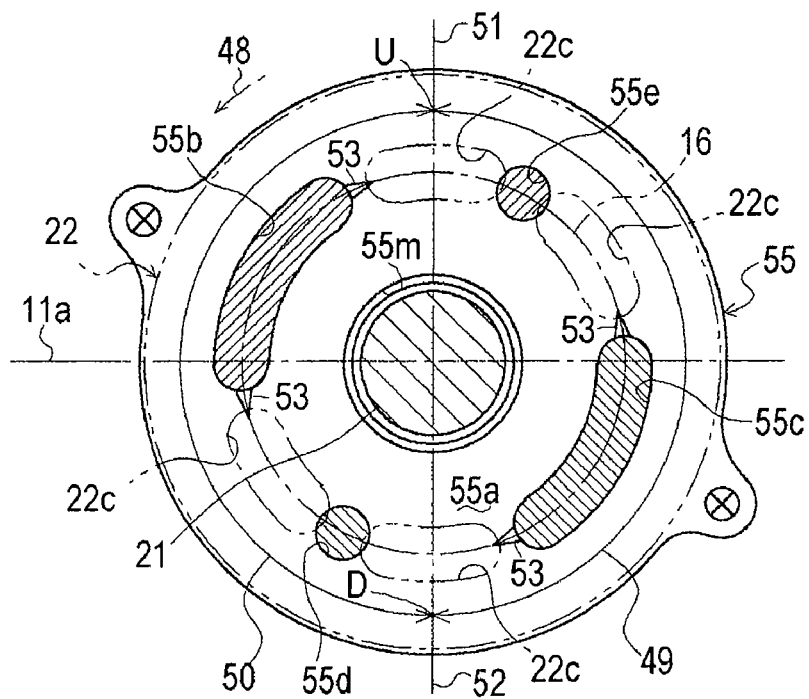
FIG. 9 is a front view of another alternative pump valve plate having point-symmetric ports.

An alternative pump valve plate 55 will be described with reference to FIG. 9. Similar to circle 16 on pump valve plate 7, phantom circle 16 is drawn on a front surface 55a of valve plate 55 so as to define the rotation locus of cylinder ports 22c and is divided into semicircles 49 and 50 by vertical lines 51 and 52 extended upward and downward from the axis of pump shaft 21 passed through a shaft hole 55p bored at a center portion of pump valve plate 55.

A pair of circular charge ports 55d and 55e are formed in pump valve plate 55 and are opened at front surface 55a. Charge port 55d is disposed on semicircle 50 below horizontal fulcrum axis 11a and charge port 55e is disposed on semicircle 49 above horizontal fulcrum axis 11a so that right and left charge ports 55d and 55e are point-symmetric with respect to the axis of pump shaft 21. Charge check valves 26, bi-directive relief valve 27 and fluid charging passages corresponding to respective passages 43 and 46 are formed in center section 5 so that the fluid charging passages are opened to respective charge ports 55d and 55e.

A pair of arcuate kidney ports 55b and 55c are formed in pump valve plate 55 and are opened at front surface 55a. Kidney port 55b is disposed on semicircle 50 above horizontal fulcrum axis 11a, and kidney port 55c is disposed on semicircle 49 below horizontal fulcrum axis 11a so that right and left kidney ports 55b and 55c are point-symmetric with respect to the axis of pump shaft 21. The arcuate shape of each kidney ports 55b and 55c is extended along circle 16 and each of kidney ports 55b and 55c is formed at opposite ends thereof in the direction of circle 16 with respective notches 53 for preventing the pulsation of hydraulic pressure. Center section 5 is formed therein with kidney ports corresponding to respective kidney ports 55b and 55c, which are connected to respective main fluid passages 5a and 5b.

Front surface 55a of pump valve plate 55 includes portions defined as respective gaps on circle 16 between charge port 55e and upper notch 53 of kidney port 55b, between lower notch 53 of kidney port 55b and charge port 55d, between charge port 55d and lower notch of kidney port 55c, and between upper notch 53 of kidney port 55c and charge port 55e. Each of the gaps is slightly shorter than the arcuate length of each cylinder port 22c of pump cylinder block 22 on circle 16. Therefore, during rotation of pump cylinder block 22, at least a very small area of each of cylinder ports 22c is constantly opened to any one of charge ports 55d and 55e, kidney ports 55b and 55c and notches 53, thereby preventing noisy pulsation of hydraulic pressure and damaging excessive hydraulic pressurization in cylinders 22b.

Figure 10:
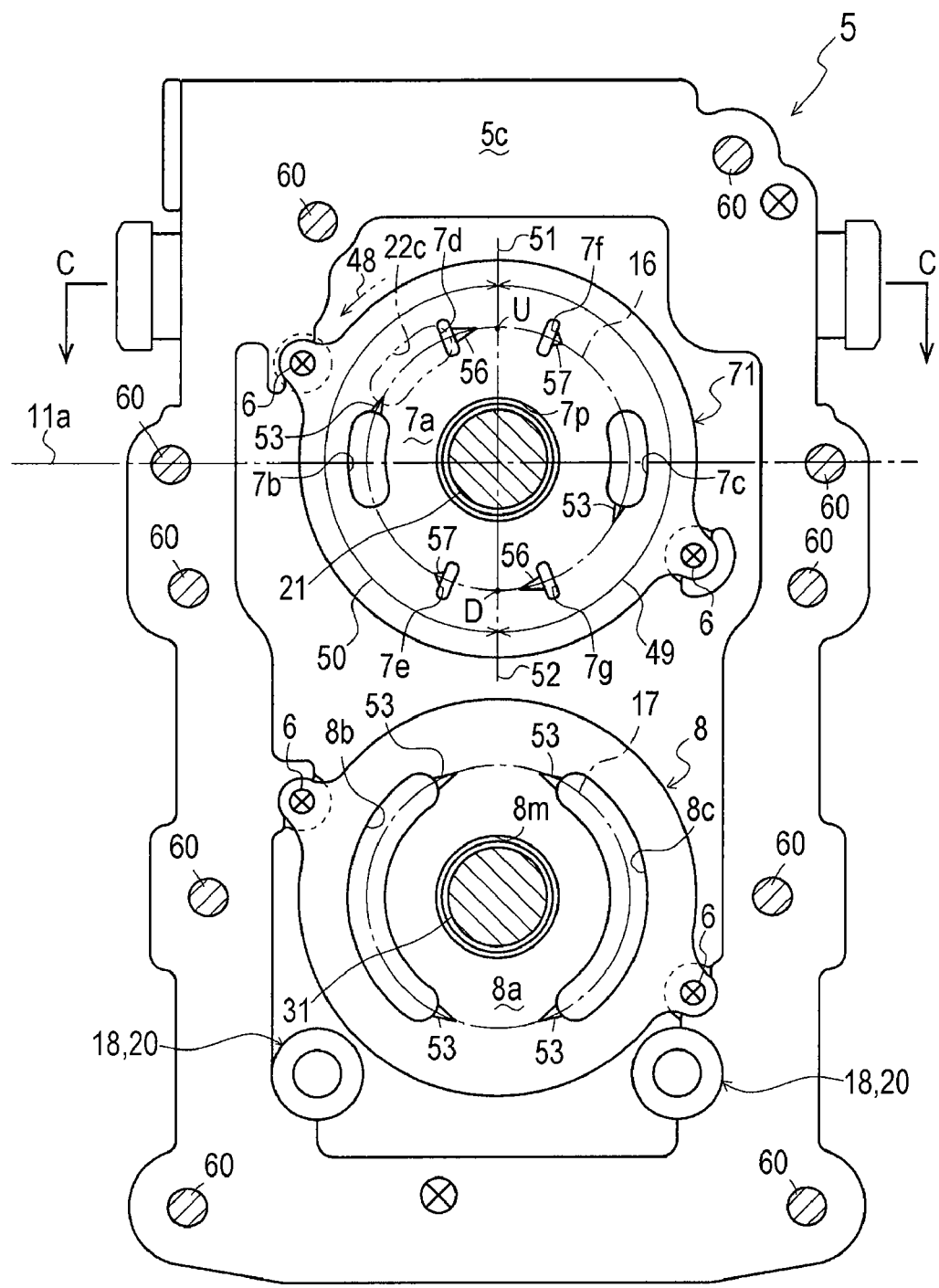
FIG. 10 is a front view of the HST from which the housing incorporating the hydraulic pump and motor has been removed, showing the center section on which another alternative pump valve plate and a motor valve plate are fixed, wherein charge ports in the pump valve plate are formed with notches.

An alternative valve plate 71 shown in FIG. 10 will be described. In FIG. 10, parts and members identical to those in FIG. 4 or having the same functions as those in FIG. 4 are designated by the same reference numerals as those in FIG. 4. Pump valve plate 71 is formed with kidney ports 7b and 7c and charge ports 7d, 7e, 7f and 7g, having the same shapes, sizes and positions as those in pump valve plate 7. The other parts of pump valve plate 71 having the same functions as those of the corresponding parts of pump valve plate 7 are designated by the same reference numerals as those for pump valve plate 7. On the assumption that pump shaft 21 rotates only in direction 48, in pump valve plate 71, each of kidney ports 7b and 7c is formed with only one notch 53 at one end thereof in the direction of circle 16. More specifically, kidney port 7b is formed at only the upper end thereof with notch 53, and kidney port 7c is formed at only the lower end thereof with notch 53.

Further, each of charge ports 7d, 7e, 8f and 7g is formed with a notch 56 or 57, which is adapted to be opened to each cylinder port 22c immediately before cylinder port 22c is opened to the charge port, thereby avoiding the above-mentioned pulsation of hydraulic pressure in sudden start of the opening of each cylinder port 22c to the charge port. In consideration that pump shaft 21 rotates only in direction 48, each of charge ports 7d, 7e, 7f and 7g is formed with only one notch 56 or 57 at one end thereof in the direction of circle 16.

Charge ports 7d and 7f are line-symmetric with respect to upper vertical line 51. However, notch 56 of charge port 7d is nearer to top end point U than notch 57 of charge port 7f, so that the slide of plunger 23 corresponding to cylinder port 22c opened to notch 56 is slower than the slide of plunger 23 corresponding to cylinder port 22c opened to notch 57. Therefore, notch 56 is formed longer in the direction of circle 16 than notch 57, thereby resulting in that the stroke of plunger 23 during the opening of corresponding cylinder port 22c to notch 56 is equal to the stroke of plunger 23 during the opening of corresponding cylinder port 22c to notch 57.

Similarly, charge ports 7e and 7g are line-symmetric with respect to lower vertical line 52, and notch 56 of charge port 7g is formed longer in the direction of circle 16 than notch 57 of charge port 7e, because notch 56 is nearer to bottom end point D than notch 57.

When the tilt of pump swash plate 24 is set to define kidney port 7b on semicircle 50 as the delivery port, each cylinder port 22c is opened to notch 56 of charge port 7d immediately before cylinder port 22c is opened to charge port 7d serving as the delivery port for delivering fluid from cylinders 22b to fluid charging passage 46, and each cylinder port 22c is opened to notch 57 of charge port 7e immediately before cylinder port 22c is opened to charge port 7e serving as the delivery port for delivering fluid from cylinders 22b to fluid charging passage 46, thereby avoiding the pulsation of hydraulic pressure in start of the fluid delivery of hydraulic pump 2 to each of charge ports 7d and 7e.

When the tilt of pump swash plate 24 is set to define kidney port 7c on semicircle 49 as the delivery port, each cylinder port 22c is opened to notch 56 of charge port 7g immediately before cylinder port 22c is opened to charge port 7g serving as the delivery port for delivering fluid from cylinders 22b to fluid charging passage 43, and each cylinder port 22c is opened to notch 57 of charge port 7f immediately before cylinder port 22c is opened to charge port 7f serving as the delivery port for delivering fluid from cylinders 22b to fluid charging passage 43, thereby avoiding pulsation of hydraulic pressure in start of the fluid delivery of hydraulic pump 2 to each of charge ports 7g and 7f.

Figure 11:
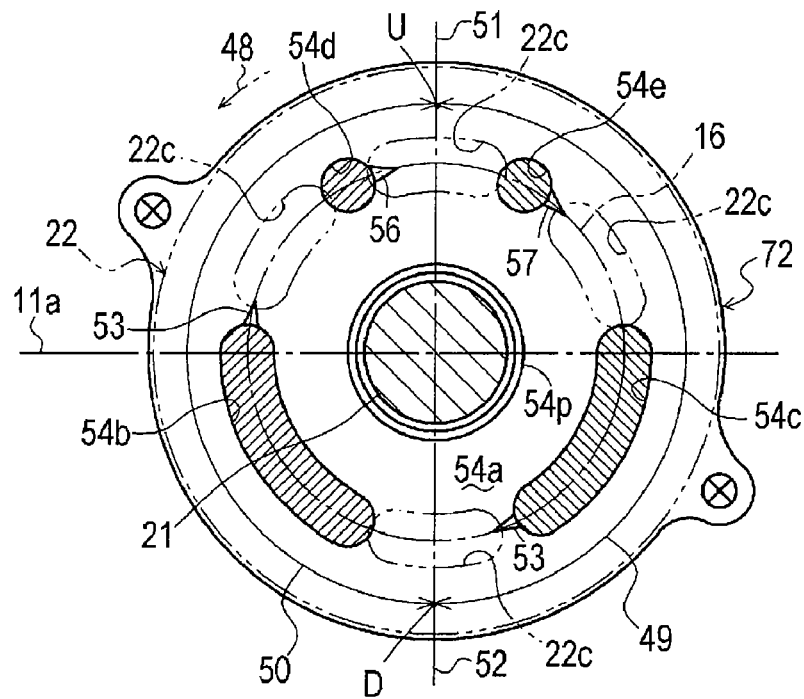
FIG. 11 is a front view of another alternative pump valve plate having charge ports formed with notches.

An alternative valve plate 72 shown in FIG. 11 will be described. Pump valve plate 72 approximates to pump valve plate 54 shown in FIG. 8. Parts of pump valve plate 72 having the same functions as those of the corresponding parts of pump valve plate 54 are designated by the same reference numerals as those for pump valve plate 54. On the assumption that pump shaft 21 rotates only in direction 48, in pump valve plate 72, each of kidney ports 54b and 54c is formed with only one notch 53 at one end thereof in the direction of circle 16. More specifically, kidney port 54b is formed at only the upper end thereof with notch 53, and kidney port 54c is formed at only the lower end thereof with notch 53.

Further, each of charge ports 54d and 54e in pump valve plate 72 is formed with notch 56 or 57, which is adapted to be opened to each cylinder port 22c immediately before cylinder port 22c is opened to charge port 54d or 54e, thereby avoiding the above-mentioned pulsation of hydraulic pressure in sudden start of the opening of each cylinder port 22c to the charge port. In consideration that pump shaft 21 rotates only in direction 48, each of charge ports 54d and 54e is formed with only one notch 56 or 57 at one end thereof in the direction of circle 16.

Similar to notches 56 and 57 of charge ports 7d and 7f in pump valve plate 71, charge ports 54d and 54e in pump valve plate 72 are line-symmetric with respect to upper vertical line 51, and notch 56 of charge port 54d is formed longer in the direction of circle 16 than notch 57 of charge port 54e, because notch 56 is nearer to top end point U than notch 57.

In foregoing pump valve plate 54, for example, the gap between charge ports 54d and 54e in the direction of circle 16 is shorter than the length of cylinder port 22c in the direction of circle 16 so that each cylinder port 22c is constantly opened to any port in pump valve plate 54 so as to prevent the pulsation of hydraulic pressure. On the contrary, in pump valve plate 72, each of charge ports 54d and 54e is formed with notch 56 or 57 for preventing the pulsation of hydraulic pressure in the starting of opening of cylinder port 22c to charge port 54d or 54e. Therefore, for example, the gap between charge ports 54d and 54e in the direction of circle 16 in pump valve plate 72 may be longer than the length of cylinder port 22c in the direction of circle 16.

Figure 12:
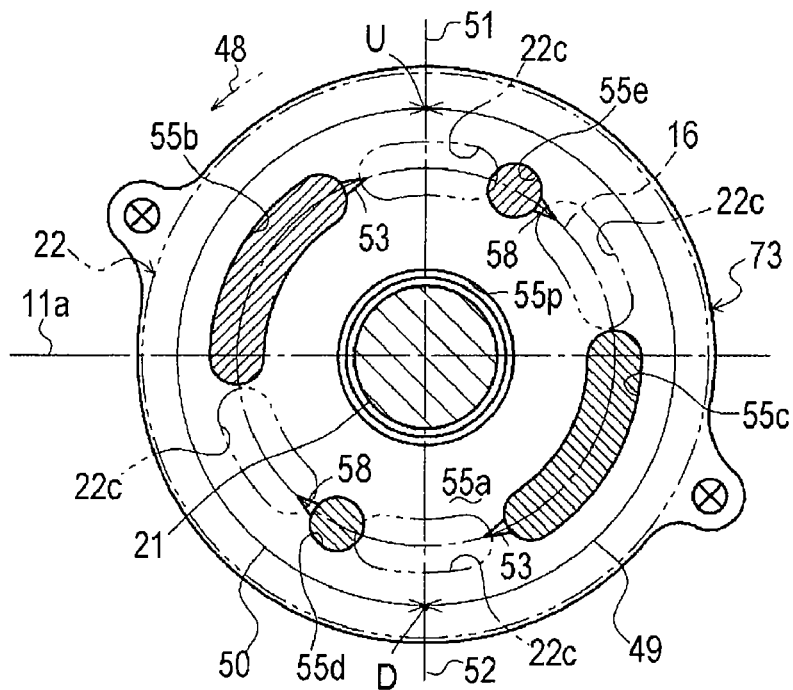
FIG. 12 is a front view of another alternative pump valve plate having charge ports formed with notches.

An alternative valve plate 73 shown in FIG. 12 will be described. Pump valve plate 73 approximates to pump valve plate 55 shown in FIG. 9. Parts of pump valve plate 73 having the same functions as those of the corresponding parts of pump valve plate 55 are designated by the same reference numerals as those for pump valve plate 55. On the assumption that pump shaft 21 rotates only in direction 48, in pump valve plate 73, each of kidney ports 55b and 55c is formed with only one notch 53 at one end thereof in the direction of circle 16. More specifically, kidney port 55b is formed at only the upper end thereof with notch 53, and kidney port 55c is formed at only the lower end thereof with notch 53.

Further, each of charge ports 55d and 55e in pump valve plate 73 is formed with a notch 58, which is adapted to be opened to each cylinder port 22c immediately before cylinder port 22c is opened to charge port 55d or 55e, thereby avoiding the above-mentioned pulsation of hydraulic pressure in sudden start of the opening of each cylinder port 22c to the charge port. In consideration that pump shaft 21 rotates only in direction 48, each of charge ports 55d and 55e is formed with only one notch 58 at one end thereof in the direction of circle 16.

In foregoing pump valve plate 55, for example, the gap between charge port 54e and kidney port 55c in the direction of circle 16 is shorter than the length of cylinder port 22c in the direction of circle 16 so that each cylinder port 22c is constantly opened to any port in pump valve plate 55 so as to prevent the pulsation of hydraulic pressure. On the contrary, in pump valve plate 73, each of charge ports 55d and 55e is formed with notch 58 for preventing the pulsation of hydraulic pressure in the starting of opening of cylinder port 22c to charge port 55d or 55e. Therefore, for example, the gap between charge port 55e and kidney port 55c in the direction of circle 16 in pump valve plate 73 may be longer than the length of cylinder port 22c in the direction of circle 16.

In each of the foregoing embodiments, hydraulic pump 2 includes valve plate 7, 54, 55, 71, 72 or 73 (hereinafter, only representative valve plate 7 is referred to) serving as a port member including the pair of kidney ports and the charge port (or ports), and center section 5 incorporates main fluid passages 5a and 5b and fluid charging passages 43 and 46 as mentioned above. Valve plate 7 is separate from center section 5 and is attached to center section 5. Therefore, valve plate 7 is a compact and handy member which can be easily exchanged for another substitute valve plate 7 in case that front surface 7a of valve plate 7 is worn away by its friction against rear end surface 22a of pump cylinder block 22, thereby and resulting in easier maintenance of HST 1. Hydraulic motor 3 also includes valve plate 8 separate from center section 5, thereby having the same advantage.

Alternatively, pump valve plate 7 (or pump valve plate 54, 55, 71, 72 or 73) may be removed, and rear end surface 22a of pump cylinder block 22 may directly and slidably rotatably abut against the pump mounting surface in front surface 5c of center section 5. In HST 1 having center section 5 shown in FIG. 5 as the representative embodiment, kidney ports 5d and 5e and charge ports 5f, 5g, 5h and 5i are formed in center section 5 and are directly opened at front end openings thereof to cylinder ports 22c without interposition of the corresponding kidney ports and charge ports in valve plate 7. In this way, center section 5, also serves as the port member of hydraulic pump 2 including the pair of kidney ports and the charge ports such as to be opened to cylinder ports 22c, thereby reducing the number of parts and costs. Further, motor valve plate 8 may be removed from hydraulic motor 3, and rear end surface 32a of motor cylinder block 32 may directly and slidably rotatably abut against the motor mounting surface in front surface 5c of center section 5, so that kidney ports 5j and 5k are directly opened at front end openings thereof to cylinder ports 32c without interposition of the corresponding kidney ports in valve plate 8.

Alternatively, center section 5 may be replaced with a pump port block, a motor port block, and pipes interposed between the pump port block and the motor port block. The pump port block serves as the upper part of center section 5 incorporating pump kidney ports 5d and 5e, fluid charging passages 41, 42, 43, 44, 45 and 46, charge ports 5f, 5g, 5h and 5i, the pair of charge check valves 26 corresponding to respective pump kidney ports 5c and 5d and bi-directive relief valve 27.

The pump kidney ports and charge ports, serving as ports 5d, 5e, 5f, 5g, 5h and 5i, are opened at a surface of the pump block, and hydraulic pump 2 is constituted by fitting surface 22a of its cylinder block 22 to valve plate 7 fixed on the surface of the pump port block, or by directly fitting surface 22a of its cylinder block 22 to the surface of the pump port block. Therefore, the pump port block or valve plate 7 fixed on the pump port block serves as the above-mentioned port member of hydraulic pump 2. Pump kidney ports and charge ports in the pump port block may be formed and arranged to correspond to the kidney ports and charge ports of each of alternative valve plates 54, 55, 71, 72 and 73 as shown in FIGS. 8-12. Pump cylinder block 22 may be fitted at surface 22a to valve plate 54, 55, 71, 72 or 73 fixed on the pump port block having the pump kidney ports and the charge ports formed and arranged to correspond to the valve plate, or may be directly fitted at surface 22a to the surface of the pump port block having the pump kidney ports and the charge ports formed and arranged to correspond to any of valve plates 54, 55, 71, 72 and 73.

The motor port block serves as the lower part of center section 5 incorporating motor kidney ports 5j and 5k. The motor kidney ports serving as ports 5i and 5k are opened at a surface of the motor block, and hydraulic motor 3 is constituted by fitting surface 32a of its cylinder block 32 to valve plate 8 fixed on the surface of the motor port block, or by directly fitting surface 32a of its cylinder block 32 to the surface of the motor port block.

The pipes are interposed between the pump port block and the motor port block so as to fluidly connect the pump kidney ports in the pump port block to the motor kidney ports in the motor port block, thereby serving as main fluid passages 5a and 5b. The pipes serving as main fluid passages 5a and 5b are also connected to the fluid charging passages in the pump port block.

It is further understood by those skilled in the art that the foregoing description is a preferred embodiment of the disclosed apparatus and that various changes and modifications may be made in the invention without departing from the scope thereof defined by the following claims.

What is claimed is:

1. A hydrostatic transmission comprising:
a pair of main fluid passages;
a fluid charging passage for supplying fluid to one of the main fluid passages;
a hydraulic motor; and
a hydraulic pump fluidly connected to the hydraulic motor via the pair of main fluid passages, wherein during driving of the hydraulic pump, one of the main fluid passages is hydraulically higher-pressurized, and the other of the main fluid passages is hydraulically lower-pressurized,
the hydraulic pump including:
a pump shaft;
a cylinder block fixed on the pump shaft so as to be rotatable integrally with the pump shaft so that an axis of the pump shaft serves as a rotary axis of the cylinder block,
wherein the cylinder block includes first and second end surfaces opposite to each other in the axial direction of the pump shaft, the first end surface being nearer to the pair of main fluid passages than the second end surface,
wherein the cylinder block includes a plurality of cylinders disposed around the pump shaft, and wherein the cylinder block includes a plurality of cylinder ports extended from the respective cylinders and opened at the first end surface of the cylinder block;

a plurality of plungers fitted in the respective cylinders of the cylinder block and projecting at tips thereof outward from the second end surface of the cylinder block;

a movable swash plate having a slanted surface against which the tips of the plungers abut; and a port member interposed between the cylinder block and the pair of main fluid passages, wherein the port member includes a surface against which the first end surface of the cylinder block slidably rotatably abuts, wherein the port member includes a pair of kidney ports fluidly connected to the respective main fluid passages and opened at the surface of the port member, wherein the port member includes a charge port fluidly connected to the fluid charging passage and opened at the surface of the port member, wherein during rotation of the cylinder block of the hydraulic pump, the cylinder ports are opened one after another to the pair of kidney ports and the charge port, so that one of the kidney ports is defined as a delivery port via which fluid is delivered from the cylinders to the main fluid passage to be hydraulically higher-pressurized, the other of kidney ports is defined as a suction port via which fluid is sucked from the main fluid passage to be hydraulically lower-pressurized to the cylinders, and fluid is delivered from the cylinders to the fluid charging fluid passage via the charge port, and wherein, when viewed in the axial direction of the pump shaft, the cylinder ports are aligned on the first end surface of the cylinder block on a circle centered on the axis of the pump shaft, and the pair of kidney ports and the charge port are aligned on the surface of the port member on a circle corresponding to the circle on which the cylinder ports are aligned.

2. The hydrostatic transmission according to claim 1, wherein one half of the circle is defined as a suction range on which the suction port is disposed, and the other half of the circle is defined as a delivery range on which the delivery port and the charge port is disposed.

3. The hydrostatic transmission according to claim 2, wherein each of the halves of the circle is defined as either the suction range or the delivery range depending on a slant direction of the slanted surface of the movable swash plate, and wherein said charge port is disposed on one half of the circle and another charge port is disposed on the other half of the circle, so that one of the charge ports disposed on the half of the circle defined as the delivery range is used for delivering fluid from the cylinders to the fluid charging passage.

4. The hydrostatic transmission according to claim 1, wherein the movable swash plate is rotatably centered on a fulcrum axis which divides the circle into halves, wherein the pair of kidney ports are symmetric with respect to the fulcrum axis, and wherein said charge port is disposed in one half of the circle and another charge port is disposed in the other half of the circle so that the charge ports are symmetric with respect to the fulcrum axis.

5. The hydrostatic transmission according to claim 1, further comprising:

a center section incorporating the pair of main fluid passages and the fluid charging passage, wherein the port member is separate from the center section and is attached to the center section.

6. The hydrostatic transmission according to claim 1, further comprising:

a center section incorporating the pair of main fluid passages and the fluid charging passage, wherein the center section has a portion which serves as the port member.

7. The hydrostatic transmission according to claim 1, further comprising:

a pump port block incorporating a pair of kidney ports and the fluid charging passage, which are adapted to be fluidly connected to the pair of main fluid passages separated from the pump port block, wherein the port member is separate from the pump port block and is attached to the pump port block so that the kidney ports in the port member are fluidly connected to the respective kidney ports in the pump port block, and the charge port in the port member is fluidly connected to the fluid charging passage in the pump port block.

8. The hydrostatic transmission according to claim 1, further comprising:

a pump port block incorporating a pair of kidney ports and the fluid charging passage, which are adapted to be fluidly connected to the pair of main fluid passages separated from the pump port block, wherein the pump port block further incorporates the charge port fluidly connected to the fluid charging passage so as to serve as the port member.

* * * * *

UNITED STATES PATENT AND TRADEMARK OFFICE
CERTIFICATE OF CORRECTION

PATENT NO. : 8,291,702 B2
APPLICATION NO. : 12/505062
DATED : October 23, 2012
INVENTOR(S) : Yasuhisa Mochizuki It is certified that error appears in the above-identified patent and that said Letters Patent is hereby corrected as shown below:

Title page, in Item (56) please correct the foreign patent reference reading "JP S60-182557 U 4/1985" to read --JP S60-182557 U 12/1985--.

Signed and Sealed this
Twenty-ninth Day of January, 2013

David J. Kappos
*Director of the United States Patent and Trademark Office*